April 16, 1968 R. V. LANGMUIR 3,378,686

METHOD OF OPERATING A LASER AS A SUPER-REGENERATIVE DETECTOR

Filed April 8, 1963

ROBERT V. LANGMUIR
INVENTOR.

BY Samuel Lindenberg
ATTORNEY

United States Patent Office 3,378,686
Patented Apr. 16, 1968

3,378,686
METHOD OF OPERATING A LASER AS A SUPER-REGENERATIVE DETECTOR
Robert V. Langmuir, Altadena, Calif., assignor to California Institute Research Foundation, Pasadena, Calif., a corporation of California
Filed Apr. 8, 1963, Ser. No. 271,263
3 Claims. (Cl. 250—199)

Superregeneration has been defined as a form of regenerative amplification in which the circuit is alternately made oscillatory and non-oscillatory at a low radio frequency rate. When this operation is properly carried out, tremendous amplification results. The operating conditions are so chosen that an oscillator operating at a low radio frequency alternately allows oscillations to build up in the regenerative circuit and then causes them to die out or to be quenched. In the absence of an input signal, thermal-agitation noises in the input circuit produce the initiating voltage that starts the building up process. However, when there is present an incoming signal larger than the thermal-agitation voltages, this signal provides the initiating pulse for the build up period and causes equilibrium to be reached sooner than when the initiating pulse is smaller. This has the effect of advancing the starting time of the oscillations and may be detected by measuring the average plate current of the oscillator which is larger in the presence of an initiating signal than without. Thus the average plate current may provide an indication of whether a small signal is present at the initiation of oscillations. The analysis of a superregenerative receiver is contained for example, in chapter 20 of volume 23 of the MIT Radiation Laboratory Series, published by the McGraw-Hill Book Co.

An object of this invention is to provide a superregenerative circuit using a maser.

Another object of this invention is to provide a super-regenerative circuit employing a maser as the amplifying element.

Yet another object of the present invention is to provide a novel superregenerative detector which can be used with frequencies in the microwave region and higher.

These and other objects of this invention may be achieved in an arrangement which employs a maser in the radio frequency oscillator. The maser is quenched at a suitable rate by an auxiliary means such as a light beam interrupter for a light maser or a defocusing voltage for the selector of an ammonia maser. When the maser is permitted to oscillate it builds up to full oscillation much sooner in the presence of an input signal to be detected than is the case when no input signal is present. Thus, by measuring the average light output in the case of the light maser, or the radio frequency output in the case of the ammonia maser the presence of a signal can be detected, as well as its modulation.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
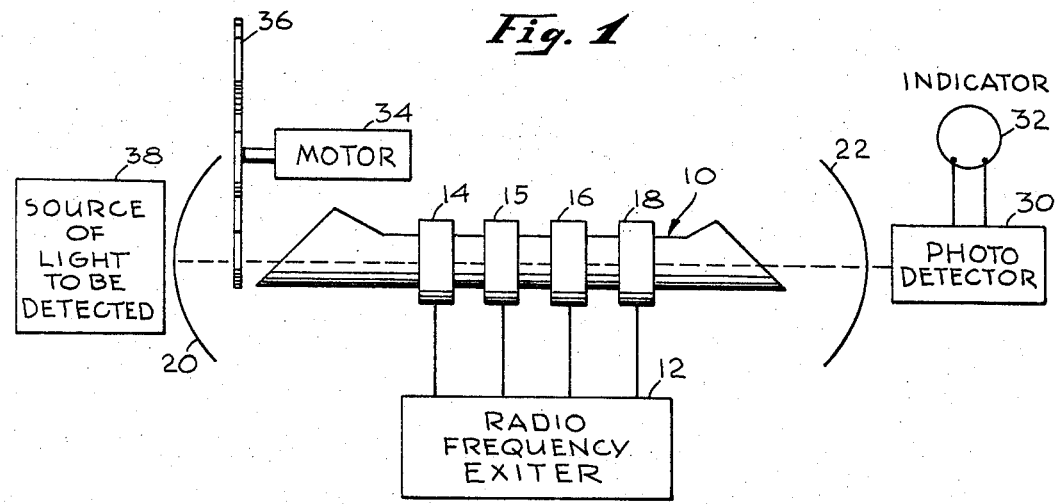
FIGURE 1 is a schematic diagram of a superregenerative detector in accordance with this invention using a light maser as the oscillator.

Reference is now made to FIGURE 1 which shows a schematic diagram of a light maser, arranged in accordance with this invention, to operate as a superregenerative detector. There is shown a gas light maser, by way of example, which may be operated in this manner. A solid maser may also be operated in this manner if the reflecting mirrors are spaced from the ends of the solid rod which is performing the "lasering" operation, rather than have them integrally formed with the ends of the rod. Thus, in FIGURE 1 a transparent dielectric tube 10, encloses a mixture of gases such as helium-neon, which can perform the required stimulated emission operation. A source of radio frequency excitation 12 applies radio frequency signals to four encircling electrodes respectively 14, 15, 16, 18, which are disposed spaced along the tube 10.

Disposed adjacent opposite ends of the column 10 are two spheroid mirrors respectively 20, 22, which are coated with dielectric layers for the purpose of reflecting substantially all of the light which may be emitted from the lasering gas mixture back into the mixture. The reflecting layers however, do pass therethrough a small amount of the light which falls thereon.

As thus far briefly described, the laser and its operation is in accordance with known principles wherein the radio frequency energy which is applied to the medium causes the gas molecules to which this energy is applied to emit photons in passing between two energy states in response to the received radio frequency excitation. It should be noted that initiation of the light emission whereby the lasering operation can commence and grow, is a random occurring operation. An atom in its excited quantum state is struck by an outside photon having the proper energy in order to cause the excited atom to give up a photon.

The radio frequency exciting source provides the energy for causing an atom to assume the excited quantum state. Thus, the gradual build up of stimulated emission until oscillation occurs is initially a random occurrence, as is the build up of oscillations in the more conventional superregenerative oscillator.

In the laser system shown, a light wave that starts out near one end of the tube travels along the axis of the tube and grows by stimulated emission until it reaches the other end of the tube. The light generated as a result is reflected by the mirror at the end, back into the active medium so that growth of the emission can continue. If the gain on repeated passages is enough to make up for the losses at the mirrors, a steady wave is built up. The light which passes through the mirror 22, falls upon a photo detector 30, which may activate any suitable indicator 32, for indicating the average amount of light.

A motor 34 rotates a toothed wheel 36. The toothed wheel is shown more clearly in FIGURE 2. This toothed wheel is positioned so that the teeth portion rotate in the laser light beam. When the light beam is interrupted the laser ceases operation, but as the wheel rotates the aperture portion of the periphery of the wheel begins to open, and the laser will begin to oscillate again. If a light signal is provided at this time which has the same frequency as the usual laser operating frequency, then oscillations will build up more rapidly and to a larger amplitude, than if the laser were left to build up by itself. Accordingly, by providing a source of light 38, which shines through the mirror 20 into the tube 10, during the interval permitted by the space between the teeth in the wheel it is possible to obtain superregenerative type of operation whereby in the presence of light from the source 38 the laser will build up its light beam much more quickly and to a greater amplitude than in the absence of light from the source 38. The toothed wheel serves the function of a quenching oscillator. If the source of light 38 is a modulated light source then the photo detector 30 can operate to detect the modulations.

Figure 2:
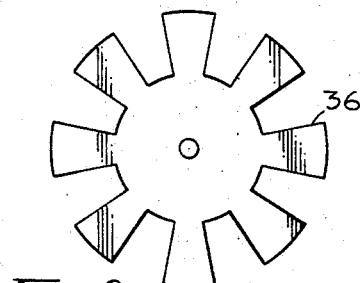
FIGURES 2 and 3 show two different arrangements for interrupting the oscillation of the light maser at a predetermined quench frequency.
Figure 3:
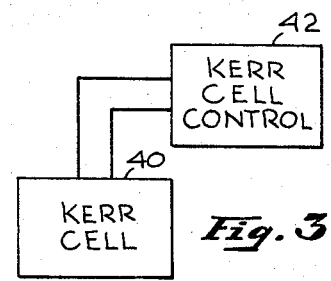

While the quenching device for the superregenerative laser has been shown as a rotating toothed wheel in FIGURE 2, other devices which perform a similar function may be used in its place. Any other type of mechanically operated shutter or an electrically operated shutter such as is shown in FIGURE 3, may be used. This comprises a Kerr cell 40, which is interposed in the light beam of the laser instead of the toothed wheel 36. The operating potentials for opening and closing a Kerr cell at a suitable quench frequency is derived from the Kerr cell control source 42. This may be a source of square waves which pulse the Kerr cell to cause it to alternately permit transmission or not, of light between the transparent column 10 and the mirror 20, at a suitable superregenerative quench frequency.

Figure 4:
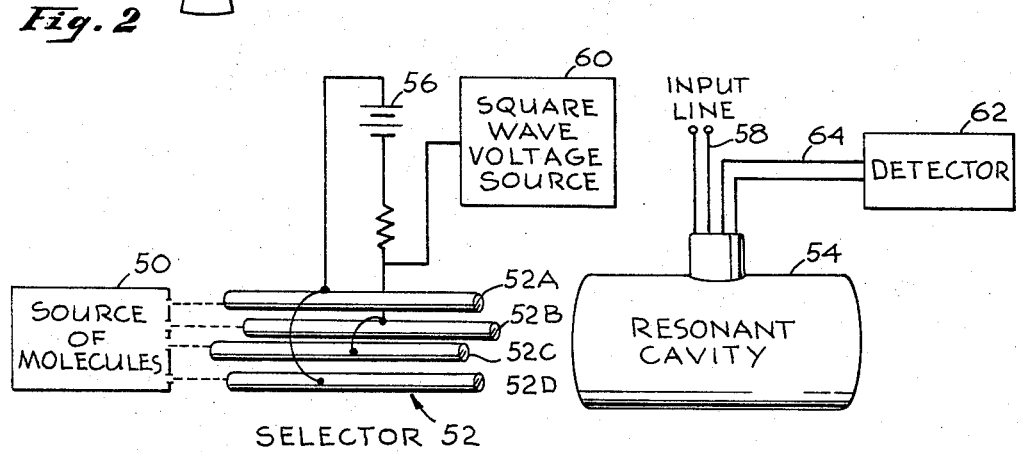
FIGURE 4 is a schematic arrangement of an ammonia maser showing how it may function as a superregenerative detector in accordance with this invention.

FIGURE 4 shows an arrangement whereby a gas maser such as an ammonia gas maser may be operated as a superregenerative detector. The usual gas maser has a mixed energy molecule source of gas 50. That is the container 50 contains gas molecules, some of which are in a low energy state and others of which are in a high energy state. A selector 52 is employed to separate the different energy state gas molecules and to pass the high energy state gas molecules into a resonant cavity 54. The selector consists of an arrangement of four rods 52A, 52B, 52C, 52D. These rods are normally charged by a DC voltage source 56, to establish an electric field therebetween. The molecules from the source 50 pass through the center of the spaced rods. The low energy state molecules are drawn off toward the rods and thus dissipated. The high energy state molcules pass along the axis of the spaced rods into the resonant cavity 54, where a microwave signal is fed in through the input line 58. The microwaves fed by the input line cause the high energy molecules to give up energy to the microwave field in the cavity and thus the incoming microwaves are amplified. If there are enough collisions between the photons which are given up by the molecules and other molecules which are in their high energy state a self sustaining chain reaction occurs whereby the amplifier turns into an oscillator generating its own output wave without any input signal.

By making provision so that enough of the high energy molecules are emitted by the source 50 to reach the resonant cavity 54, through the selector 52, oscillation will build up in the resonant cavity 54, in the absence of an input signal on the line 58. The build up of these oscillations however, occurs at a random frequency. Of course, the application of a signal on the input line 58 can cause a much earlier and greater oscillation build up than when such signal is omitted.

In order to achieve a superregenerative type of operation a square wave voltage from a source 60 is applied or combined with the voltage from the source 56. This will cause oscillations to start and stop in the cavity 54, in response to the square wave superimposed voltage. This occurs because the combined DC and square wave act to dissipate most if not all of the high energy molecules during the intervals that the square wave amplitude is minimum and permit these high energy molecules to pass to the resonant cavity when the square wave amplitude is maximum. Now, any radio frequency signal (at the proper frequency which is on the order of 24 kmc. with ammonia) will be amplified to a much higher degree than were the case previously. A detector 62, which is connected into the resonant cavity 54, by means of an output line 64, can measure the presence of an amplified input signal.

It may also be possible to achieve superregenerative type of operation of a solid state maser which uses a crystal between the poles of a magnet by varying the field strength of the magnet at a suitable quench frequency either using a bucking field or a coil wound around the main magnet and excited from a source of current at a suitable frequency.

There has been accordingly described and shown herein a novel, useful, and unique superregenerative circuit employing masers as the amplifying and oscillating device.

I claim:
1. A method of operating a laser as a superregenerative detector comprising:
the steps of substantially continuously applying stimulating emission to said laser, periodically interrupting the light path of said laser within the laser cavity, and shining a radiation to be detected into said laser during the intervals when the light path within said laser cavity is not interrupted.

2. A method as recited in claim 1 wherein the step of periodically interrupting the light path of said laser within the laser cavity includes inserting and removing a light interrupting object from the light path of said laser within the laser cavity.

3. A method as recited in claim 1 wherein the step of periodically interrupting the light path of said laser within the laser cavity includes periodically rotating the polarization of the light within the light path of said laser cavity to periodically spoil the Q of said cavity.

References Cited

UNITED STATES PATENTS

| | | | |
|---|---|---|---|
| 3,229,223 | 1/1966 | Miller | 250—199 X |
| 3,243,724 | 3/1966 | Vuylsteke | 331—94.5 |
| 3,281,712 | 10/1966 | Koester | 250—199 X |
| 2,879,439 | 3/1959 | Townes | 330—4 |
| 2,962,585 | 11/1960 | Bolef et al. | 330—4 |
| 3,075,156 | 1/1963 | Anderson et al. | 325—468 |

FOREIGN PATENTS 608,711  3/1962  Belgium.

OTHER REFERENCES

Collins et al., Journal Appl. Phys., vol. 33, No. 6, June 1962, pp. 2009–2011, 331–94.5.

Electronics, vol. 35, No. 13, Mar. 30, 1962, pp. 24, 25 331–94.5.

Hellwarth, Advances in Quantum Electronics, 1961, pp. 340, 250–199.

ROBERT L. GRIFFIN, *Primary Examiner.*

JOHN W. CALDWELL, DAVID G. REDINBAUGH, *Examiners.*

B. V. SAFOUREK, *Assistant Examiner.*